Figure 1:
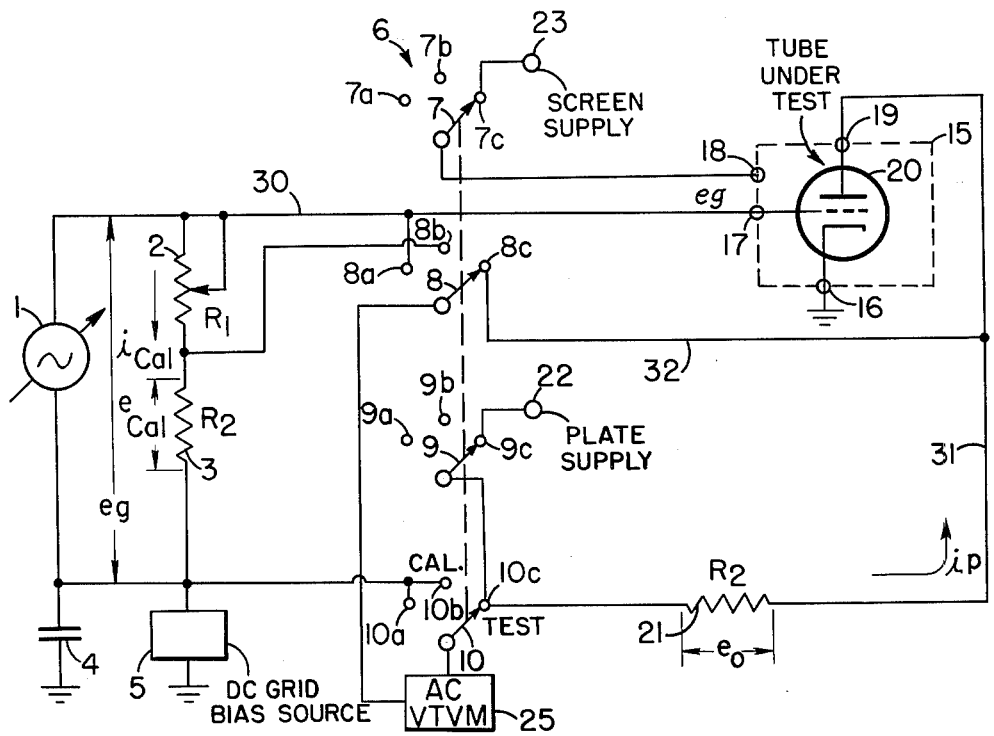

Aug. 21, 1962   B. A. BIRNIE   3,050,677
TRANSCONDUCTANCE MEASURING APPARATUS
Filed Jan. 20, 1960

CALIBRATION CHART
(LOG LOG PLOT)

INVENTOR.
Bruce A. Birnie
BY Wilfred H. Caldwell
ATTORNEY

United States Patent Office 3,050,677
Patented Aug. 21, 1962

3,050,677
TRANSCONDUCTANCE MEASURING APPARATUS
Bruce A. Birnie, Danvers, Mass., assignor to Columbia Broadcasting System, Inc., Danvers, Mass., a corporation of New York
Filed Jan. 20, 1960, Ser. No. 3,610
3 Claims. (Cl. 324—26)

This invention relates to electrical measuring apparatus, and more particularly to circuitry for determining the transconductance of an electron discharge device The transconductance, or mutual conductance $g_m$, of an electron discharge device such as a vacuum tube, is defined as the ratio of the change in output or plate current to the change in input or grid voltage which produced it. This figure is a measure of the ability of the tube to provide signal power output and hence is an important parameter to the circuit designer. Methods heretofore used to measure $g_m$ required elaborate bridge or resistor networks to compensate for meter impedances and were difficult to maintain accurately calibrated. The present invention overcomes the shortcomings of prior art devices and enables accurate measurements to be made simply and rapidly.

Accordingly, the primary object of this invention is to provide improved apparatus for measuring the transconductance of an electron discharge device.

Another object of this invention is to provide simple transconductance measuring apparatus capable of covering an extended range of transconductance values.

Still another object of this invention is to provide transconductance measuring apparatus which may be quickly and easily calibrated.

Yet another object of this invention is to provide transconductance measuring apparatus utilizing a minimum of precision components.

In accordance with the present invention, an alternating current signal is applied to the input electrode of the device under test as well as across a series combination of a fixed resistance and variable resistance. In the output circuit of the device is inserted an additional resistance equal in value to the fixed resistance. A multiple-pole ganged switching arrangement is provided whereby a voltmeter may be connected across either the fixed resistance or the additional resistance. In the former position, the voltmeter is calibrated in the desired range of $g_m$ values; in the latter position, the voltmeter directly indicates the transconductance of the tube under test. A commercially available precision potentiometer is used as the variable resistance, enabling a wide range of transconductance values to be accommodated by the apparatus.

The foregoing and other objects, features, and advantages of the invention will become apparent from the following more detailed description thereof, taken in conjunction with the accompanying drawings.

Figure 2:
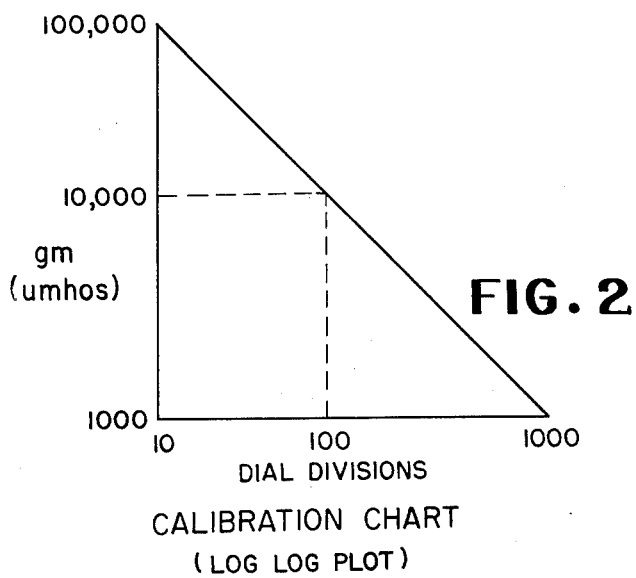

In the drawings:

FIG. 1 is a circuit diagram of the improved measuring circuit of the invention; and FIG. 2 is a calibration chart for use with the apparatus of FIG. 1.

Referring now to FIG. 1, the circuit of this invention comprises a source of alternating current signal 1 of variable amplitude, across the terminals of which is connected the series combination of variable resistor 2, designated as $R_1$, and fixed resistor 3, designated as $R_2$. Capacitor 4 is coupled between the lower terminal of resistor 3 and ground to provide an A.C. reference level for the circuit. A D.C. source 5 is also connected to this point to provide grid bias for the tube under test.

Indicated generally at 6 is a ganged switching arrangement comprising switch arms or wipers 7, 8, 9, and 10 actuated in unison as indicated by the dotted line. Associated with switch arm 7 are contacts 7a, 7b, and 7c. Similarly, switch arm 8 has contacts 8a, 8b, and 8c; switch arm 9 has contacts 9a, 9b, and 9c; and switch arm 10 has contacts 10a, 10b, and 10c. The ungrounded upper terminal of source 1 is connected to contact 8a of switch 6 while the common junction of resistors 2 and 3 is connected to contact 8b. The grounded side of the source 1 is connected to both contact 10a and 10b.

The tube to be tested is inserted in a test jig or socket of any suitable type shown as the dotted rectangle 15. This receptacle includes terminals 16, 17, 18, and 19, adapted to contact respectively the cathode, control grid, screen grid, and plate pins of an electron discharge device inserted therein. Connections for cathode heater power (not shown) are also provided in any convenient manner. For illustrative purposes, a triode vacuum tube is shown under test, but it is to be understood that the apparatus may be used with any type of device having a transconductance parameter.

The ungrounded terminal of source 1 is connected to the terminal 17 via conductor 30 to provide an input signal voltage for the tube under test. Terminal 16 is returned to reference potential and terminal 19 is connected via conductor 31 and through resistor 21 to terminal 10c, and also directly to terminal 8c over lead 32. Resistor 21 is made equal in value to resistor 3 and is similarly designated as $R_2$. Plate supply voltage source 22 is connected to terminal 9c, and switch arm 9 is directly connected to terminal 10c. Screen supply voltage source 23 is connected to contact 7c with switch arm 7 providing a connection to terminal 18 on the receptacle 15. With the triode being used as an example, no screen voltage is required and the terminal 18 remains open. A commercially available A.C. vacuum tube voltmeter 25, coupled between switch arms 8 and 10, is used as the indicating instrument.

Referring back now to the definition of transconductance, this parameter is the ratio of the change in output current to the change in input voltage which produced it. In terms of the circuit of FIG. 1:

(1) $$g_m = \frac{i_p}{e_g}$$

where $i_p$ is the alternating plate current resulting from the application of an alternating voltage $e_g$ to the control grid of the tube under test. As can be appreciated, only the alternating current components of voltage and current are of importance and in the following analysis, only these are considered.

The voltage drop across resistance 21, $e_0 = i_p R_2$, and the voltage drop across resistance 3, $e_{cal} = i_{cal} R_2$. If $e_g$ is adjusted until $e_{cal} = e_0$, then $i_{cal} = i_p$, since both resistances 3 and 21 are equal to $R_2$. In this condition, both $R_1$ and the tube under the test appear as identical loads to the source 1. Substituting in Equation 1:

(2) $$g_m = \frac{i_{cal}}{e_g}$$

But, from the calibration circuit, $$i_{cal} = \frac{e_g}{R_1 + R_2}$$

therefore $$g_m = \frac{1}{R_1 + R_2}$$

This relationship, it is seen, is independent of $e_g$ and $e_{cal}$, and since $R_2$ is fixed, $R_1$ is the only variable.

If the potentiometer 2 is provided with an accurately calibrated scale, Equation 3 may be plotted to provide a calibration chart of the type illustrated in FIG. 2. In an embodiment of the circuit actually constructed, $R_1$ (resistance 2) is a 0 to 1000 ohm precision potentiometer requiring ten complete turns of its adjustment dial to vary over the entire scale. The potentiometer scale is marked with 1000 divisions. $R_2$ (each of the resistances 3 and 21) is 10 ohms. $R_1+R_2$ thus varies from 10 to 1010 ohms. The scale of $R_1$ however, is adjusted so that at the 0 ohm position on the potentiometer, the dial is at the tenth scale marking, and at the one-thousandth scale marking, $R_1$ is 990 ohms. The scale divisions on the potentiometer read directly the sum of $R_1+R_2$. A plot of $g_m$ versus $R_1+R_2$ on logarithmic coordinates produces the calibration curve of FIG. 2. It will be understood of course, that the values indicated above are merely exemplary, and many different values of $R_1+R_2$ may be chosen. This example, however, serves to illustrate the wide range of transconductance values, in this case 1000 to 100,000 micromhos, that can be measured the circuit of this invention.

To make a measurement, $R_1$ is adjusted to a point which will give the range of values desired, as determined from the calibration chart. For example, if a value in the 10,000 micromho range is to be measured, $R_1$ is adjusted to its one-hundredth scale division, as determined from the chart of FIG. 2. Switch 6 is turned to its center or Calibrate position, which connects the A.C. vacuum tube voltmeter 25 across resistance 3 ($R_2$). The voltage $e_g$ is adjusted by varying the amplitude of the output of generator 1 until the meter deflection desired for the particular measurement is obtained. The zero deflection point on the meter scale will always correspond to $g_m=0$, since in this condition, there will be no plate current. The meter scale is then proportioned in accordance with the spacing between the zero point and the calibration point. The magnitude of the meter deflection desired for the calibration point is determined by factors such as the range of values expected to be measured and the required limit of accuracy of the measurement.

Once the meter scale has thus been calibrated, it is necessary only to insert the tube to be tested into the receptacle 15 and throw switch 6 to its right-hand Test position. This provides the necessary D.C. operating potentials to the tube and connects the meter 25 across resistance 21 ($R_2$), in effect measuring $e_0$. Since the calibration point previously established was done so for the condition that $e_{cal}=e_0$, it follows that if the actual $g_m$ of the tube is below this point, $e_0$ will be smaller and the meter deflection correspondingly less. Similarly, if it is higher, the meter deflection will be greater. With the meter scale previously calibrated in micromhos, the transconductance may be read directly. To facilitate this direct reading, a number of meter scales corresponding to respective different calibration points and meter deflections, may be prepared and applied over the standard scale as needed.

The above described method of calibration and measurement is of particular advantage where it is desired to measure a large number of tubes and it is known that the transconductance should be approximately the same for all the devices. These conditions would obtain, for example, in a tube manufacturing operation. The apparatus may also be used with great facility for measurements such as might be performed in the laboratory. The unknown device would be inserted in the test socket with switch 6 in the Test position, and the meter value noted. Then, without changing $e_g$, the switch would be thrown to its Calibrate position and $R_1$ adjusted until the meter is the same as that noted when in the Test position. The value of $g_m$ is then obtained from the calibration chart.

As a means of checking the accuracy of the apparatus, a third position of switch 6 is provided, including contacts 7a, 8a, 9a, and 10a. In this position, meter 25 is connected directly across source 1 and thereby measures $e_g$. This permits the accuracy of the calibration circuit to be readily checked.

As is apparent from the foregoing, the present invention provides an extremely versatile and accurate apparatus for measuring transconductance, which is simple to operate and calibrate. A wide, continuously variable range of values can be measured and no standard tubes or similar devices are required for calibration. The apparatus is thus adaptable for use both in the laboratory and on the production line.

It will be understood that various modifications may be made by those skilled in the art without departing from the spirit and scope of the invention.

What I claim is:

1. Apparatus for measuring the transconductance of an electron discharge device having control grid and plate electrodes comprising, a source of alternating current test signals, a calibration circuit separate from said electron discharge device and including a variable impedance and a first fixed impedance connected in series across said source, means connecting said source to the control grid of said device to supply input potentials thereto, a second fixed impedance equal in magnitude to said first fixed impedance having one terminal thereof for connection to the plate electrode of said electron discharge device, a source of plate supply voltage, voltage indicating means, and multiposition switching means operative in a first position to connect said voltage indicating means across said source of test signals, operative in a second position to connect said voltage indicating means across said first fixed impedance, and operative in a third position to connect said plate supply voltage source to the other terminal of said second fixed impedance and said voltage indicating means across said second fixed impedance.

2. An apparatus according to claim 1 wherein said first and second fixed impedances are resistors of equal value, and means for varying the magnitude of said variable impedance to change the scale of values readable on said voltage indicating means.

3. Apparatus for measuring the transconductance of an electron discharge device having control grid and plate electrodes comprising, a source of alternating current test signals, a calibration circuit separate from said electron discharge device and including a variable impedance and a first fixed impedance connected in series across said source, means connecting said source to the control grid of said device to supply input potentials thereto, a second fixed impedance equal in magnitude to said first fixed impedance having one terminal thereof for connection to the plate electrode of said electron discharge device, a source of plate supply voltage, voltage indicating means, and multiposition switching means operative in a first position to connect said voltage indicating means across said source of test signals, operative in a second position to connect said voltage indicating means across said first fixed impedance, and operative in a third position to connect said plate supply voltage source to the other terminal of said second fixed impedance and said voltage indicating means across said second fixed impedance, said variable impedance being a continuous controllable resistance so that said voltage indicating means may be calibrated to read a continuous range of values.

References Cited in the file of this patent

UNITED STATES PATENTS

| | | |
|---|---|---|
| 2,873,424 | Lowery | Feb. 10, 1959 |
| 2,973,473 | Oakes et al. | Feb. 28, 1961 |